US005392545A

United States Patent [19]
Claman et al.

[11] Patent Number: 5,392,545
[45] Date of Patent: Feb. 28, 1995

[54] APPARATUS AND METHOD FOR PROCESSING AND STORING X-RAY FILM SHEETS

[76] Inventors: Gary C. Claman; Kenneth Claman, both of 26072 Cresta Verde, Mission Viejo, Calif. 92691

[21] Appl. No.: 7,064

[22] Filed: Jan. 21, 1993

[51] Int. Cl.$^6$ ............................................. G09F 1/10
[52] U.S. Cl. .................................. 40/159; 40/159.2
[58] Field of Search ............ 40/159, 159.2, 361, 40/366, 152, 152.1; 206/455

[56] References Cited

U.S. PATENT DOCUMENTS

| | | | |
|---|---|---|---|
| 1,617,304 | 2/1927 | Groeschel | 40/159 |
| 2,208,019 | 7/1940 | Darling | 40/152 X |
| 2,587,434 | 2/1952 | Boaden et al. | 40/159.2 X |
| 2,687,590 | 8/1954 | Johnson | 40/159 |
| 3,195,258 | 7/1965 | Gwin | 40/159.2 |
| 3,508,355 | 4/1970 | Hooper | 40/366 |
| 3,736,685 | 6/1973 | Shibata . | |
| 3,822,495 | 7/1974 | Ohfuji . | |
| 3,973,344 | 8/1976 | Frankel | 40/159.2 |
| 4,110,924 | 9/1978 | Moderatho . | |
| 4,333,254 | 6/1982 | Stevenson | 40/159 X |
| 4,333,254 | 6/1982 | Stevenson . | |
| 4,361,974 | 12/1982 | Wood . | |
| 4,988,556 | 1/1991 | Nilsen et al. . | |

Primary Examiner—Kenneth J. Dorner
Assistant Examiner—Joanne Silbermann
Attorney, Agent, or Firm—Macro-Search Corp.

[57] ABSTRACT

An apparatus and method is provided for processing and storing a plurality of x-ray film sheets. A carrier frame includes a plurality of window frames in the carrier frame, each of which define a window for holding one of the film sheets. Each of the window frames has a peripheral indentation for supporting one of the x-ray film sheets in a position coplanar with the window frame. A first pair of opposing slots supports the film sheet as a packet in a position generally orthogonal to the window frame. A mounting-dismounting fixture comprises a plate having on one side of the plate a plurality of first rectangular bosses, each of which provides a mounting surface such that with the mounting-dismounting fixture engaged with the carrier frame, the mounting surfaces provide a limit to the depth of insertion of each of the film sheets into the peripheral indentations. On the other side of the plate, a plurality of second rectangular bosses provide a pushing surface such that with the mounting-dismounting fixture engaged with the carrier frame, the pushing surfaces may be used to dislodge the film sheets from the peripheral indentations of the window frames. A film sheet mount is further included and has a base sheet with an adhesive surface for holding the film sheets thereon, and a transparent cover sheet for covering the film sheets after the film sheets are mounted onto the base sheet.

9 Claims, 3 Drawing Sheets

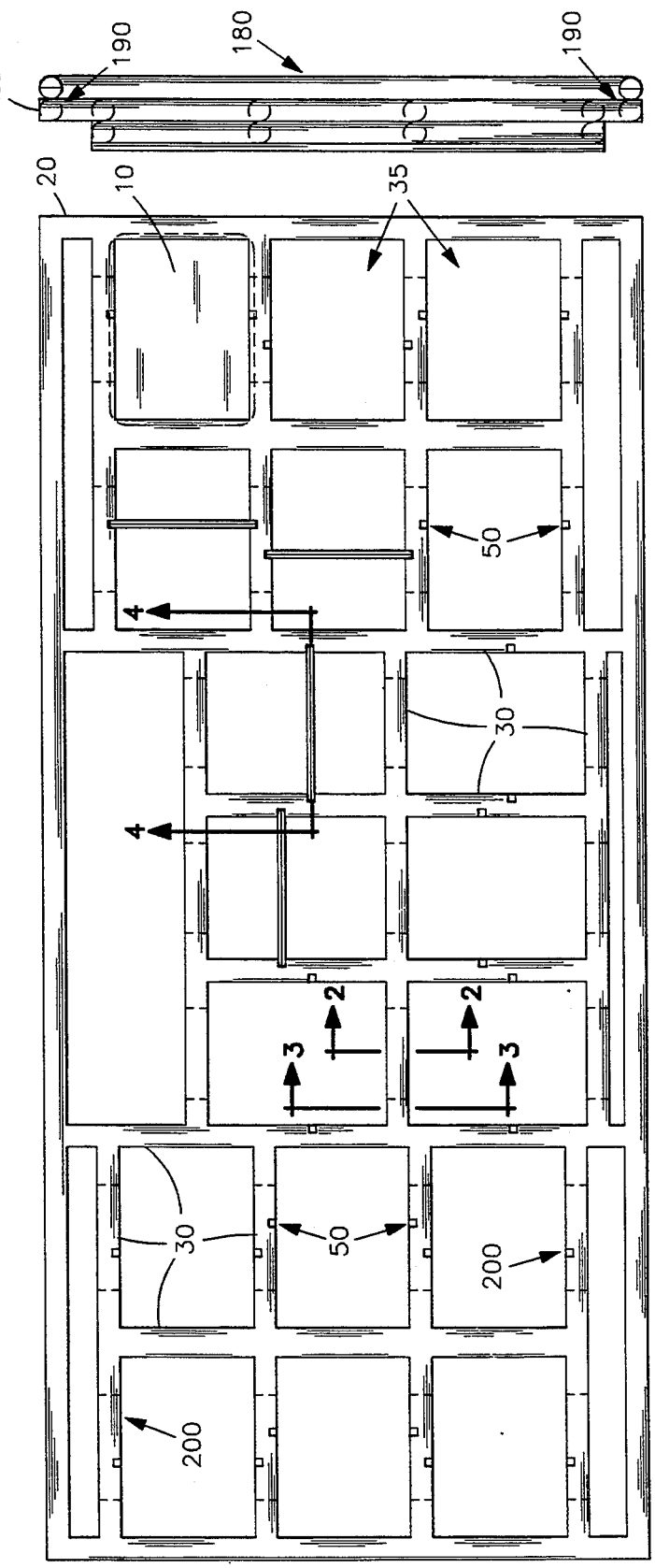

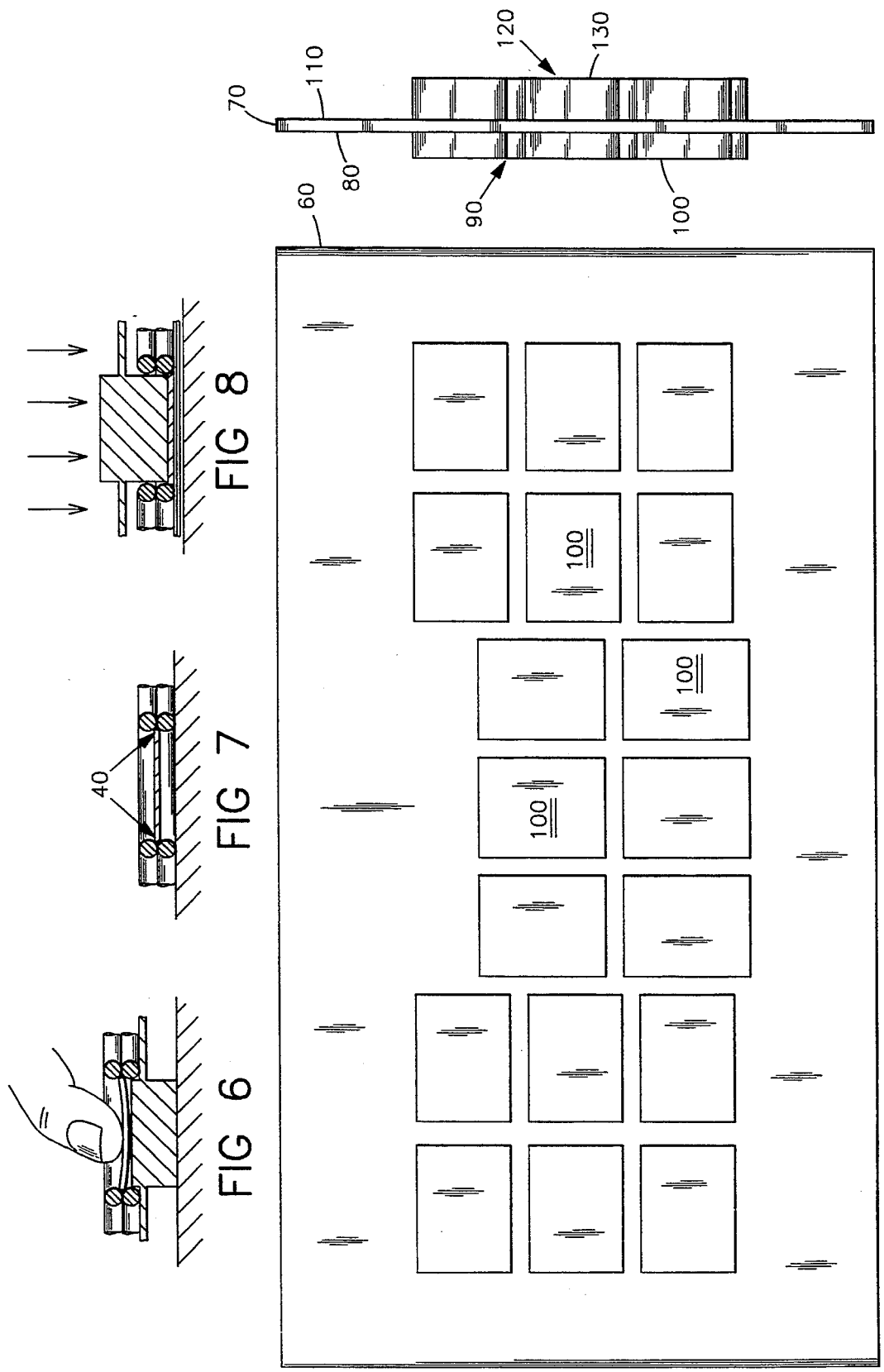

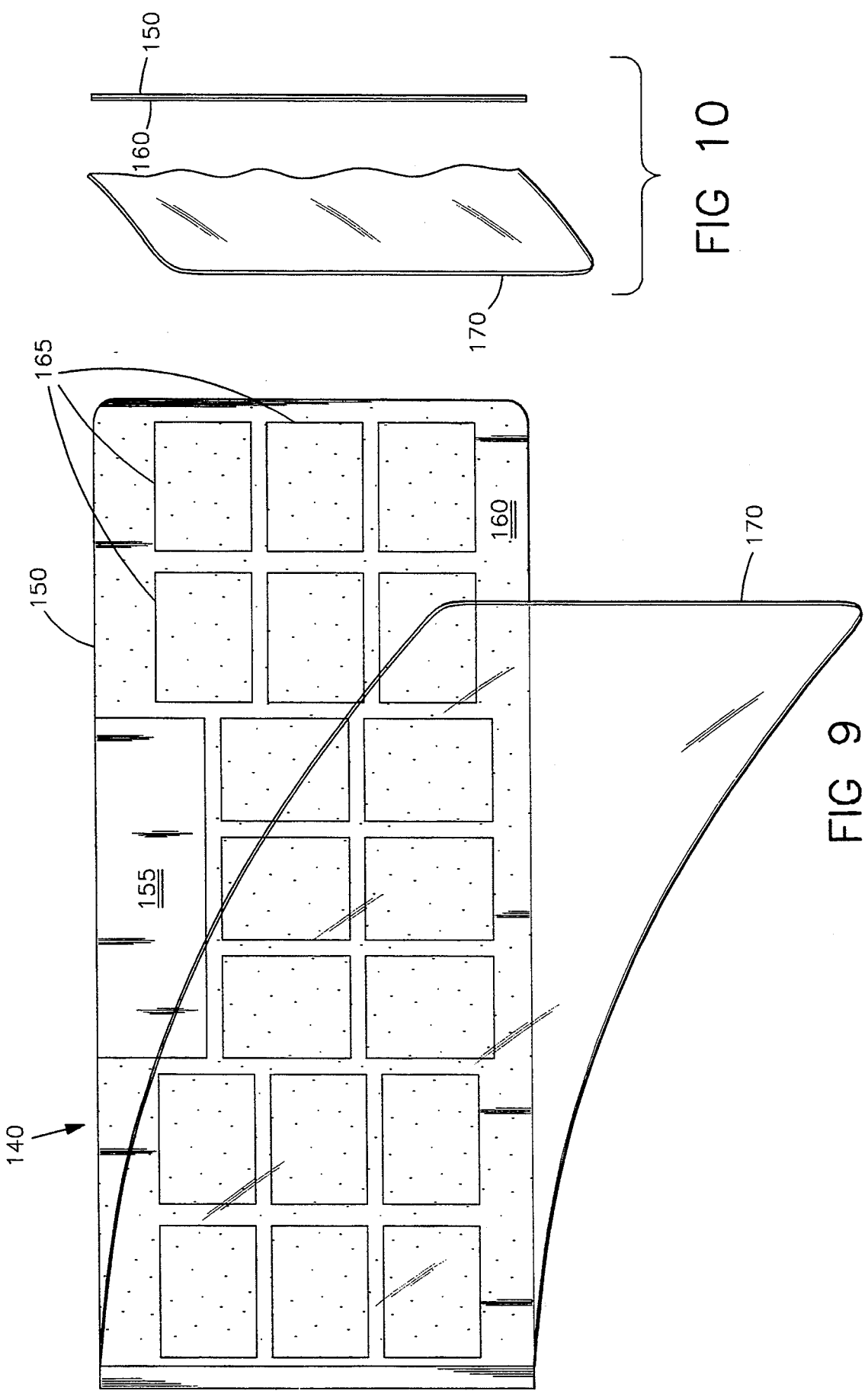

APPARATUS AND METHOD FOR PROCESSING AND STORING X-RAY FILM SHEETS

FIELD OF THE INVENTION

This invention relates generally to film mounting devices and film handling methods, and, more particularly, is directed toward a method and device for developing, mounting, and storing x-ray films.

BACKGROUND OF THE INVENTION

Conventional methods of processing dental x-ray films typically involve placing a film packet into a patient's mouth, taking an exposure, removing the film packet from the patient's mouth and placing it aside, and repeating the process until all of the exposures have been taken. Then the bundle of packets is typically moved to a developing room where an undeveloped film sheet is removed from each film packet and attached to a rack. The rack is then submerged in various film developing fluids and dried. Subsequently, each film sheet, now developed, is mounted in an x-ray mount package for viewing, such as taught in U.S. Pat. No. 4,333,254 to Stevenson on Jun. 8, 1982, or as taught in U.S. Pat. No. 4,110,924 to Moderatho on Sep. 5, 1978. As is typical of film mounting devices, these devices require each film sheet to be individually mounted, one at a time, by the dental practitioner. As a typical full-set of x-rays can include eighteen to twenty individual films, such a mounting process can take considerable time. Further, the practitioner developing such films must take care to properly position each film on the film mount since the positioning of the films on the mount is important to a dentist viewing and interpreting the films. Such deliberate and careful positioning of each film takes considerable time and requires specific knowledge of how to interpret the films. As such, the task of developing x-ray films requires some skilled knowledge about dentistry and radiology, and cannot be passed off to a less-expensive office clerk, or similar personnel.

If the developing rack that is typically used to submerge the x-ray films were also used as an x-ray film organizer and carrier, the final positioning of the x-ray films would be dependent upon their positioning on the rack. As a result, little effort would be required to mount the films since the films would already be organized in a known sequence. However, conventional developing racks are not well suited for organizing and carrying film packets and film sheets since the shape of the rack does not correspond well with the x-ray mount devices mentioned earlier. Further, such a rack is ill-suited for carrying or transporting x-ray films since the films are typically held only at one side and are prone to detachment from the rack if the rack or the films inadvertently contact with some other object. Further, conventional developing racks make no provision for protecting the films from damage that may be caused by contact with other objects. As a result, such a developing rack is not suitable for use as a carrier or an organizer of x-ray film sheets.

Clearly, then, there is a need for a device that can serve as an x-ray film packet organizer, a protective film carrier, a developing rack, and a film sheet organizer. Such a needed device would maintain the organization of film packets and film sheets throughout the dental x-ray process, and would require very little knowledge of dentistry and radiology on the part of the person developing and mounting the x-ray films. Further, such a needed device would save considerable time in the developing process, and would significantly reduce the possibility of errant positioning of x-ray films during mounting and possible errors in diagnosis on the part of the dentist interpreting such films. Moreover, such a needed device would be easy to manufacture, dean, and otherwise maintain. There is also a clear need for a film mounting device that cooperates with such a film organizer and carrier. Such a film mounting device would not require individual, one-by-one positioning of each film sheet. The present invention fulfills these needs and provides further related advantages.

SUMMARY OF THE INVENTION

The present invention is an apparatus and method for processing and storing a plurality of x-ray film sheets. A carrier frame includes a plurality of window frames in the carrier frame, each of which define a window for holding one of the film sheets. Each of the window frames has a peripheral indentation for supporting one of the x-ray film sheets in a position coplanar with the window frame. A first pair of opposing slots supports the film sheet as a packet in a position generally orthogonal to the window frame. The slots are spaced apart such that the film packet is held therein by the inherent elastic resiliency of the film packet, and such that the bulk of the film packet extends from the carrier frame. The carrier frame further includes a slot opening in each of the peripheral indentations such that liquid may drain from one of the peripheral indentations into the adjacent peripheral indentation and then from the carrier frame itself.

A mounting-dismounting fixture comprises a plate having on one side of the plate a plurality of first rectangular bosses for engaging the window flames. Each of the first bosses provides a mounting surface such that with the mounting-dismounting fixture engaged with the carrier frame, the mounting surfaces provide a means to limit the depth of insertion of each of the film sheets into the peripheral indentations, assuring the engagement of the film sheets with the peripheral indentations. On the other side of the plate, a plurality of second rectangular bosses are provided for engaging the window frames of the carrier frame. Each of the second bosses provide a pushing surface such that with the mounting-dismounting fixture engaged with the carrier frame, the pushing surfaces provides means to dislodge the film sheets from the peripheral indentations of the window frames.

A film sheet mount is further included. A base sheet of the mount includes an adhesive surface for holding the film sheets thereon, and a transparent cover sheet for covering the film sheets after the film sheets are mounted onto the base sheet. The carrier frame preferably further includes a mount holder for supporting the mount in place on one side of the carrier frame during the transfer of the film sheets from the window frames to the mount. The mount holder includes a second pair of opposing slots into which opposing edges of the base sheet are positioned and held.

The present device serves as an x-ray film packet organizer, a protective film carrier, a developing rack, and a film sheet organizer. Use of the present device and method maintains the organization of film packets and film sheets throughout the dental x-ray exposure, developing, and mounting process, and as a result requires very little knowledge of dentistry and radiology on the part of the person developing and mounting the x-ray films. Further, the present device saves considerable time in the developing process, and significantly reduces the possibility of errant positioning of x-ray films during mounting and possible errors in diagnosis on the part of the dentist interpreting the films. Moreover, the carrier frame and mounting-dismounting fixture are easy to manufacture, clean, and otherwise maintain. The cooperating mounting means of the present invention is also relatively inexpensive to manufacture and use, especially when taking into account the reduced time involved in positioning x-ray films on the mounting means. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings: FIG. 1A is a top plan view of a carrier frame of the invention, illustrating window frames defining windows of the invention;

FIG. 1B is a right side elevational view of the carrier frame of FIG. 1A, illustrating a mounting holding means of the invention;

FIG. 2 is a cross-sectional view of the carrier frame of FIG. 1A, taken generally along lines 2—2 of FIG. 1A, and illustrating a slot opening of the invention;

FIG. 3 is a cross-sectional view of the carrier frame of FIG. 1A, taken generally along lines 3—3 of FIG. 1A, and illustrating a first holding means of the invention;

FIG. 4 is a cross-sectional view of the carrier frame of FIG. 1A, taken generally along lines 4—4 of FIG. 1A, and illustrating a second holding means for holding a film packet generally orthogonal to the carrier frame;

FIG. 5A is a top plan view of a mounting-dismounting fixture of the invention, illustrating a pattern of bosses thereof;

FIG. 5B is a right side elevational view of the mounting-dismounting fixture of FIG. 5A;

FIG. 6 is a cross sectional view of one side of the mounting-dismounting fixture of FIG. 5A engaged with the carrier frame of FIG. 1A, illustrating a film sheet being pressed into the first holding means of FIG. 2 and stopped by a first boss means;

FIG. 7 is a cross-sectional view of the carrier frame of FIG. 1A, illustrating the film sheet as held by the first holding means of FIG. 2;

FIG. 8 is a cross-sectional view of the other side of the mounting-dismounting fixture of FIG. 5A engaged with the carrier frame of FIG. 1A, illustrating the film sheet being dislodged from the first holding means by a second boss means;

FIG. 9 is a perspective illustration of a mounting means of the invention, illustrating a base sheet with an adhesive layer and a pattern of position indicators, and a transparent cover sheet; and FIG. 10 is a left side elevational view of the mounting means of FIG. 9.

DETAILED DESCRIPTION OF THE PREFERRED EMBODIMENT

FIG. 1 illustrates an apparatus for processing and storing a plurality of x-ray film sheets 10. A carrier frame 20 includes a plurality of window frames 30 in the carrier frame 20, each of which define a window 35 for holding one of the film sheets 10. Each of the window frames 30 has a first holding means 40 for supporting one of the x-ray film sheets 10 in a position coplanar with the window frame 30. Preferably, the first holding means 40 is a peripheral indentation within each of the window frames 30 (FIG. 7). Such a carrier frame 20 with peripheral indentations 40 may be readily fabricated by fixing two plastic tubular frames together, or by injection molding. The carrier frame 20 is preferably made of plastic, but might also be manufactured from a rigid metal material or other suitably rigid material that is not damaged by film developing chemicals and that may be readily cleaned.

A second holding means 50 supports the film sheet 10 as a packet 55 in a position generally orthogonal to the window frame 30. Preferably, the second holding means 50 is a first pair of opposing slots positioned on opposing sides of the window flames 30 so that one of the film packets 55 may be placed in the slots for support of the film packet 55 (FIGS. 1A and 4). The slots are spaced apart such that the film packet 55 is held therein by the inherent elastic resiliency of the film packet 55. The slots are of such extent as to limit the position of the film packet 55 such that the bulk of the film packet 55 extends from the carrier frame 20 (FIG. 4).

The carrier frame 20 further includes a liquid draining means 200 used while developing the film sheets 10. The draining means 200 includes a slot opening 210 in each of the peripheral indentations such that liquid may drain from one of the peripheral indentations into the adjacent peripheral indentation and then from the carrier frame 20 itself. As such, developing liquids and the like (not shown) are prevented from collecting in the peripheral indentations of the window frames 30.

A mounting-dismounting fixture 60 comprises a plate 70 having on one side 80 of the plate 70 a plurality of first rectangular boss means 90 for engaging the window frames 30 (FIGS. 5A and 5B). Each of the first boss means 90 provides a mounting surface 100 such that with the mounting-dismounting fixture 60 engaged with the carrier frame 20, the mounting surfaces 100 provide a means to limit the depth of insertion of each of the film sheets 10 into the peripheral indentations 40, assuring the engagement of the film sheets 10 with the peripheral indentations 40 (FIG. 6). On the other side 110 of the plate 70, a plurality of second rectangular boss means 120 are provided for engaging the window frames 30 of the carrier frame 20. Each of the second boss means 120 provide a pushing surface 130 such that with the mounting-dismounting fixture 60 engaged with the carrier frame 20, the pushing surfaces 130 provides means to dislodge the film sheets 10 from the peripheral indentations 40 of the window frames 30 (FIG. 8). The plate 70 and each of the boss means 90,120 are preferably made from a transparent plastic material, such that the film sheets 10 may be viewed through the mounting-dismounting fixture 60 while the mounting-dismounting fixture 60 is being used.

A film sheet mounting means 140 is further included (FIG. 9). A base sheet 150 of the mounting means 140 includes an adhesive surface 160 for holding the film sheets 10 thereon, and a transparent cover sheet 170 for covering the film sheets 10 after the film sheets 10 are mounted onto the base sheet 150. Such an adhesive 160 is necessarily transparent so that the x-ray films 10 may be viewed therethrough. Minnesota Mining and Manufacturing product number 62-6091-4830-9 is an example a suitable adhesive 160. The base sheet 150 is preferably fixed at one edge to a corresponding edge of the transparent cover sheet 170, and an area 155 of the base sheet 150 is devoid of adhesive 160 and includes a surface suitable for marking, such as with a pen or pencil. The carrier frame 20 preferably further includes a mounting holding means 180 for supporting the mounting means 140 in place on one side of the carrier frame 20 during the transfer of the film sheets 10 from the window frames 30 to the mounting means 140. The mounting holding means 180 includes a second pair of opposing slots 190 into which opposing edges of the base sheet 150 are positioned (FIG. 1B). The inherent elastic resiliency of the base sheet 150 maintains the mounting means 140 in the mounting holding means 180.

The carrier frame 20, the mounting-dismounting fixture 60, and the mounting means 140 all have the same spatial pattern of windows 35, bosses 90,120, and position indicators 165, respectively. Further, such a pattern is preferably symmetric so that either side of the mounting-dismounting fixture 60 may be engaged with either side of the carrier frame 20. Such a pattern, as shown in FIG. 1A, 5A, and 9, is not limited to the pattern shown but, instead, may be any pattern suitable for the final viewing of dental x-ray films. Such patterns include, but are not limited to, those patterns shown in U.S. Pat. No. 4,988,556 to Nilsen et al., issued on Jan. 29, 1991, for example.

In use, a plurality of film packets 55 may be held in the carrier frame 20, each in a position generally orthogonal to the window flames 30 for organizing the film packets 55 after exposure and for transporting the packets to a light-safe environment, such as a film developing machine, or the like (not shown). The carrier frame 20 is then positioned over the mounting-dismounting fixture 60 so that the set of first rectangular mounting boss means 90 engage the windows 35 of the carrier frame 20. A film sheet 10 is then removed from each film packet 55 and set into the corresponding window 35 by positioning the film sheet 10 over the window 35 and pressing the film sheet 10 into the window frame 30 until the film sheet 10 is positioned in each of the peripheral indentation 40 of the window frame 30. The first rectangular boss means 90 is used as a position limiter for the film sheet 10 for aiding in the positioning of the film sheet 10 into the peripheral indentation 40 of the window frame 30. The carrier frame 20 with the film sheets 10 mounted therein is then moved through a film developing and drying process. Such a carrier frame 20 may clearly include additional means for mounting within any particular film developing machine, or the like (not shown).

After the film sheets 10 have been developed and dried, the mounting means 140 is engaged with the corresponding carrier frame 20 and the corresponding mounting-dismounting fixture 60 is placed over the carrier frame 20 so that the second rectangular dismounting boss means 120 are engaged downwardly into the windows 35 of the carrier frame 20. As such, all of the film sheets 10 may be pushed onto the mounting means 140 simultaneously simply by pressing down on the mounting-dismounting fixture 60, thereby capturing the film sheets 10 on the adhesive surface 160 of the mounting means 140 in the organized pattern of the carrier frame 20.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A system for processing and storing a plurality of x-ray film sheets comprising:

a carrier frame including a plurality of window frames in the carrier frame, each one of said window frames having first holding means for supporting one of the x-ray film sheets in a position coplanar with the window frame and second holding means for supporting the film sheet in a position orthogonal to the window frame;

a mourning-dismounting fixture for use with the carrier frame comprising a plate having on one side of the plate a plurality of first rectangular boss means engaging the window frames, each of the boss means having size and shape approximate each respective window frame, and providing a mounting surface such that with the mounting-dismounting fixture engaged with the carrier frame the mounting surfaces provide a means to limit the depth of insertion of each of the film sheets to assure the engagement of the film sheets with the first holding means, and, on the other side of the plate, a plurality of second rectangular boss means, each having size and shape approximate each respective window frame alternately engaging the windows of the carrier frame, each of the boss means providing a pushing surface such that with the mounting-dismounting fixture engaged with the carrier frame the pushing surfaces dislodge the film sheets from the window flames; and a film sheet mounting means including a base sheet including an adhesive surface holding the film sheets thereon, and a transparent cover sheet covering the film sheets after said film sheets are mounted onto the base sheet;

whereby a plurality of film packets are held in the carrier frame, each in a position orthogonal to the window frames for organizing the film packets and for transporting the packets to a light safe environment, and for mounting the film sheets into the frame using the mounting-dismounting fixture to place each one of said film sheets into one of the window frames therein, so that the film sheets may be developed and dried and whereby the film sheets may be dismounted into the mounting means in a position appropriate for each of the film sheet to be viewed diagnostically and for storing the film sheets.

2. The system of claim 1 wherein each of the first holding means is a pair of slots, each one of the slots being positioned on opposing sides of one of the window flames so that with one of the film sheets placed in said slots for support of the film sheet therein, the slots being spaced apart such that the film sheet is held therein by the inherent elastic resiliency of the film sheet, the slots being of such extent as to limit the position of the film sheet such that the bulk of the film sheet extends from the carrier frame.

3. The system of claim 1 wherein each of the first holding means is a peripheral indentation within each of the window frames of such dimension as to provide for the film sheets to be placed into said peripheral indentation, the opposing portions of the indentation being spaced apart such that a film sheet is held therein by the inherent elastic resiliency of the film sheet.

4. The system of claim 1 wherein the carrier frame further includes a mounting holding means for supporting the mounting means in place on one side of the carrier frame during the transfer of the film sheets from the window frames to the mounting means, said mounting holding means including a pair of opposing slots into which opposing edges of the base sheet are positioned, and held therein by the inherent elastic resiliency of the base sheet.

5. The system of claim 1 wherein the carrier frame further includes a means for draining liquids used for developing the film sheets, the draining means including a slot opening in each of the peripheral indentations such that liquid may drain from one of the peripheral indentation into the adjacent :peripheral indentations.

6. A method for processing and displaying a plurality of x-ray film sheets comprising the steps of:
a) providing the x-ray film sheets as exposed film packets;
b) providing a film carrier frame with film mounting window frames defining windows therein, a mounting-dismounting fixture, and a film mounting means;
c) placing each of the exposed film packets into one of the window frames of the carrier frame so that each one of the film packets is positioned orthogonally with respect to the windows of each of the window frames;
d) transporting the carrier frame and exposed film packets to a film exposure safe environment;
e) placing the carrier frame over a mounting-dismounting fixture so that a set of mounting bosses on the mounting-dismounting fixture are engaged upwardly into the windows of the carrier frame;
f) lifting each exposed film packet out of the carrier frame to remove each of the film sheets from the respective film packet;
g) pressing each of the film sheets into the respective window frame in the carrier frame until each of the film sheets is positioned in one of the window frames using each of the bosses as a position limiter;
h) moving the carrier frame with the film sheets in it through a film developing and drying process;
i) engaging a mounting means having an adhesive upward facing surface with the carrier frame;
j) placing the mounting-dismounting fixture over the carrier frame so that a set of dismounting bosses in the mounting-dismounting fixture are engaged downwardly into the window flames of the carrier frame to push the film sheets onto the mounting means so that the film sheets are captured on the adhesive surface of the mounting means.

7. The method of claim 6 wherein the exposed film packets are held by a pair of opposing slots in each of the window flames.

8. The method of claim 6 wherein each one of the film sheets is held in a peripheral indentation within each of the window frames.

9. The method of claim 6 wherein the film mounting means is supported by the carrier frame by a pair of opposing slots.

* * * * *